United States Patent
Saito et al.

(10) Patent No.: US 8,028,949 B2
(45) Date of Patent: Oct. 4, 2011

(54) WEBBING TAKE-UP DEVICE

(75) Inventors: Takuhiro Saito, Niwa-gun (JP); Katsuki Asagiri, Niwa-gun (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 904 days.

(21) Appl. No.: 11/547,716

(22) PCT Filed: Mar. 17, 2005

(86) PCT No.: PCT/JP2005/004769
§ 371 (c)(1),
(2), (4) Date: Feb. 13, 2008

(87) PCT Pub. No.: WO2005/097563
PCT Pub. Date: Oct. 20, 2005

(65) Prior Publication Data
US 2008/0283652 A1    Nov. 20, 2008

(30) Foreign Application Priority Data

Apr. 8, 2004  (JP) ................................ 2004-114312

(51) Int. Cl.
*B60R 22/46*    (2006.01)
(52) U.S. Cl. .................................... 242/374; 242/390.8
(58) Field of Classification Search .................. 242/374, 242/390.8, 390.9; 280/806, 807; 297/475–478
See application file for complete search history.

(56) References Cited

U.S. PATENT DOCUMENTS

| | | | | |
|---|---|---|---|---|
| 4,489,804 A | * | 12/1984 | Kamijo | 180/268 |
| 4,529,143 A | * | 7/1985 | Kanada et al. | 242/375.3 |
| 4,534,441 A | * | 8/1985 | Kamijo et al. | 180/268 |
| 4,546,934 A | * | 10/1985 | Nishimura et al. | 242/372 |
| 4,570,872 A | * | 2/1986 | Tsujimura et al. | 242/390.8 |
| 4,588,144 A | * | 5/1986 | Nishimura | 242/375.3 |
| 4,637,630 A | * | 1/1987 | Nishimura et al. | 280/807 |
| 4,741,556 A | * | 5/1988 | Nagashima | 280/807 |
| 4,787,569 A | * | 11/1988 | Kanada et al. | 242/371 |
| 5,244,231 A | | 9/1993 | Bauer et al. | |
| 6,494,395 B1 | * | 12/2002 | Fujii et al. | 242/374 |
| 2001/0032902 A1 | * | 10/2001 | Specht | 242/374 |
| 2003/0094534 A1 | | 5/2003 | Fujii et al. | |

FOREIGN PATENT DOCUMENTS

| | | |
|---|---|---|
| EP | 0 092 810 A2 | 11/1983 |
| GB | 2 238 947 A | 6/1991 |
| JP | 2000-118352 A | 4/2000 |
| JP | 2001-130376 A | 5/2001 |
| JP | 2001-347923 A | 12/2001 |
| JP | 2004-17765 A | 1/2004 |
| WO | 01/70547 A1 | 9/2001 |
| WO | 03/059707 A1 | 7/2003 |

* cited by examiner

*Primary Examiner* — Michael Mansen
*Assistant Examiner* — Scott Haugland
(74) *Attorney, Agent, or Firm* — Roberts Mlotkowski Safran & Cole, P.C.

(57) ABSTRACT

In a webbing take-up device 10, a worm gear 34, which is connected to a motor 44, engages with a gear wheel 32, and when the worm gear 34 rotates, driving force is transmitted via the gear wheel 32 and a clutch 26, whereby a take-up shaft 20 is rotated in a take-up direction. Helix angles of teeth of the worm gear 34 and the gear wheel 32 are set so that thrust force generated at this time along the axial direction of the gear wheel 32 faces a leg plate 16 fixed side of a case 30. Accordingly, because the thrust force acts on the leg plate 16 fixed side of the case 30, i.e., on a frame 12, there is no need to provide the case 30 or a cover clutch 31 with high strength and rigidity.

11 Claims, 4 Drawing Sheets

WEBBING TAKE-UP DEVICE

TECHNICAL FIELD

The present invention relates to a webbing take-up device, and particularly to a webbing take-up device that is capable of taking up a webbing due to a take-up shaft being rotated by a motor.

BACKGROUND OF THE ART

A seat belt apparatus for restraining a vehicle occupant is equipped with a webbing take-up device. Some webbing take-up devices have been proposed which each include a so-called tension reducer mechanism for mitigating or eliminating an excessive sensation of pressure that the vehicle occupant feels when a webbing is applied to the occupant, or a pretensioner mechanism that eliminates a slight looseness called "slack" or the like by taking up a webbing belt onto a take-up shaft by a certain amount at the time when a vehicle rapidly decelerates or the like and that increases a restraining force by which the webbing belt restrains the body of the vehicle occupant, thereby allowing the body of the vehicle occupant to be held more reliably. Further, there also has been known a so-called motor retractor having a structure in which the aforementioned various functions are performed by a motor (by way of example, refer to the patent document 1 and the patent document 2 shown below).

In this type of motor retractor, for example, respective functions of the tension reducer and pretensioner as mentioned above can be not only demonstrated, but also an auxiliary operation for taking up or pulling out a webbing when the webbing is normally applied can be performed. Thus, an extremely beneficial effect is obtained.

Further, particularly in recent years, there has been considered, in the aforementioned motor retractor, a structure which detects a distance forward to another vehicle, an obstacle or the like using a forward looking monitoring device such as a distance sensor, and when the distance forward to the vehicle, an obstacle or the like is less than a certain value, activates a motor, and rotates a take-up shaft in a take-up direction by rotating force of the motor. In this type of motor retractor, a clutch is interposed between an output shaft of the motor and the take-up shaft so as to transmit rotating force of the motor to the take-up shaft and prevent transmission of rotation from the take-up shaft to the motor, and this clutch is structured to allow only the rotation from the output shaft of the motor to be transmitted to the take-up shaft.

Incidentally, in the conventional motor retractor as described above, in a case in which a driving force transmission mechanism that allows the rotating force of the motor to be transmitted to the clutch is comprised of a gear wheel or the like, if the motor is rapidly rotated so as to forcibly rotate the take-up shaft in the take-up direction, a large thrust force or reaction force acts on a case having the clutch accommodated and held therein, or a holding component for holding a gear mechanism, and the like. For this reason, it is necessary to improve extra strength of structural components such as a case, a cover and the like so that these components can resist such large thrust force or reaction force. This results in that realization of a light-weight device or cost reduction of the device would be impeded.

Patent document 1: JP-A No. 2001-130376
Patent document 2: JP-A No. 2001-347923

DISCLOSURE OF THE INVENTION

Problems to be Solved by the Invention

In view of the aforementioned circumstances, it is an object of the present invention to provide a webbing take-up device that not only allows a take-up shaft to rotate by a motor, but also needs no improvement of extra strength and can realize a light-weight device and cost reduction of the device.

Means for Solving the Problems

A webbing take-up device according to a first aspect of the present invention comprises: a frame having a pair of leg plates that face each other, and a back plate, the pair of leg plates being connected integrally by the back plate; a take-up shaft that is rotatably supported between the pair of leg plates and that takes up a webbing belt for restraining a vehicle occupant by rotating in one direction around its axis with a base end portion of the webbing belt being engaged with the take-up shaft; a motor; a case fixed sideward of either one of the pair of leg plates; a cover that covers a side of the case opposite to a side at which the one leg plate is fixed; a worm gear accommodated in the case and connected to the motor; a worm wheel accommodated in the case coaxially with the take-up shaft and meshing with the worm gear, the worm wheel being rotated by rotation of the worm gear; and a clutch accommodated in the case and mechanically interposed between the worm wheel and the take-up shaft, the clutch being provided so as to rotate the take-up shaft in a webbing take-up direction by transmitting rotating force of the worm-wheel to the take-up shaft, and interrupting transmission of rotating force generated at the side of the take-up shaft, thereby preventing transmission of the rotation to the worm wheel, wherein helix angles of teeth of the worm gear and worm wheel are set so that thrust force, which is generated along an axial direction of the worm wheel at the time when the take-up shaft rotates in the webbing take-up direction due to driving of the motor, faces the leg plate fixed side of the case.

In the webbing take-up device of the aforementioned first aspect, a vehicle occupant sits at a seat of a vehicle, a webbing belt is applied around the body of the vehicle occupant, and for example, due to a tongue plate provided in a webbing belt being engaged with a buckle device, the webbing belt is brought into a state of being secured over the body of the occupant.

Further, for example, if an obstacle exists ahead of a vehicle during a running operation of the vehicle and a space between the vehicle and the obstacle (a distance from the vehicle to the obstacle) falls within a predetermined range, driving of the motor is started. When the motor is driven, the driving force of the motor is transmitted via the worm gear and the worm wheel to the clutch, and further, rotating force is transmitted via the clutch to the take-up shaft, so as to rotate the take-up shaft in the webbing take-up direction. As a result, the webbing is taken up onto the take-up shaft from the base end side thereof, and a slight looseness generated in the webbing belt, that is to say, "slack" in the state of the webbing belt being applied is eliminated, and a restraining force by which the webbing belt restrains the body of the vehicle occupant can be increased.

In the webbing take-up device of the first aspect, helix angles of teeth of the worm gear and the worm wheel are set so that thrust force generated along the axial direction of the worm wheel at the time when the take-up shaft rotates in the webbing take-up direction by driving of the motor faces the leg plate fixed side of the case (that is, the side opposite to that at which the cover is disposed). Accordingly, thrust force generated along the axial direction of the worm wheel, which force is caused by engagement of the worm gear and the worm wheel when the motor is rapidly rotated so as to rotate the take-up shaft in the take-up direction as described above, is exerted on the leg plate fixed side of the case, that is to say, the frame.

As a result, it becomes unnecessary to improve extra strength and rigidity of the case and the cover, which allows them to resist a large thrust force or reaction force, and the constitutional sizes of the case and cover can be made smaller. Further, the fixing method thereof, and so on can be simplified. Accordingly, a light-weight and small-size device or cost reduction of the device can be realized. Further, the thrust force generated in the worm wheel is reliably received by the frame, and therefore, the rotating force can be stably and reliably transmitted via the clutch to the worm gear and the worm wheel, thereby resulting in that the performance of taking up the webbing belt becomes stable.

A webbing take-up device according to a second aspect of the present invention comprises: a frame having a pair of leg plates that face each other, and a back plate, the pair of leg plates being connected integrally by the back plate; a take-up shaft that is rotatably supported between the pair of leg plates and that takes up a webbing belt for restraining a vehicle occupant by rotating in one direction around its axis with a base end portion of the webbing belt being engaged with the take-up shaft; a motor; a case fixed sideward of either one of the pair of leg plates, the side of the case at which the one leg plate is fixed being open; a worm gear accommodated in the case and connected to the motor; a worm wheel accommodated in the case coaxially with the take-up shaft and meshing with the worm gear, the worm wheel being rotated by rotation of the worm gear; and a clutch accommodated in the case and mechanically interposed between the worm wheel and the take-up shaft, the clutch being provided so as to rotate the take-up shaft in a webbing take-up direction by transmitting rotating force of the worm wheel to the take-up shaft, and interrupting transmission of rotating force generated at the side of the take-up shaft, thereby preventing transmission of the rotation to the worm wheel, wherein helix angles of teeth of the worm gear and worm wheel are set so that thrust force, which is generated along an axial direction of the worm wheel at the time when the take-up shaft rotates in the webbing take-up direction due to driving of the motor, faces the leg plate fixed at the case.

In the webbing take-up device of the aforementioned second aspect, a vehicle occupant sits at a seat of a vehicle, a webbing belt is applied around the body of the vehicle occupant, and for example, due to a tongue plate provided in a webbing belt being engaged with a buckle device, the webbing belt is secured over the body of the vehicle occupant.

Further, for example, if an obstacle exists ahead of a vehicle during a running operation of the vehicle and a space between the vehicle and the obstacle (a distance from the vehicle to the obstacle) falls within a predetermined range, driving of the motor is started. When the motor is driven, the driving force of the motor is transmitted via the worm gear and the worm wheel to the clutch, and further, rotating force is transmitted via the clutch to the take-up shaft, thereby causing the take-up shaft to rotate in the webbing take-up direction. As a result, the webbing is taken up onto the take-up shaft from the base end side thereof, and a slight looseness generated in the webbing belt, that is to say, "slack" in the state of the webbing belt being applied is eliminated, and a restraining force by which the webbing belt restrains the body of the vehicle occupant can be increased.

In the webbing take-up device of the second aspect, helix angles of teeth of the worm gear and the worm wheel are set so that thrust force generated along the axial direction of the worm wheel at the time when the take-up shaft rotates in the webbing take-up direction by driving of the motor faces the leg plate at which the case is fixed (that is, the open side of the case). Accordingly, thrust force generated along the axial direction of the worm wheel caused by engagement of the worm gear and the worm wheel when the motor is rapidly rotated so as to rotate the take-up shaft in the take-up direction is exerted on the leg plate at the side at which the case is fixed, that is to say, the frame.

As a result, it becomes unnecessary to improve extra strength and rigidity of the case, so that it can withstand a large thrust force and reaction force, and thus, the constitutional size of the case can be made small. Further, the fixing method thereof, and the like can be simplified. Accordingly, a light-weight and small-size device or cost reduction of the device can be realized. Further, the thrust force generated in the worm wheel is reliably received by the frame, and therefore, the rotating force can be stably and reliably transmitted via the clutch to the worm gear and the worm wheel. As a result, the performance of taking up the webbing belt becomes stable.

Further, a webbing take-up device according to a third aspect of the present invention is a webbing take-up device for taking up a webbing belt for restraining a vehicle occupant, comprising: a frame having a pair of leg plates facing each other, and a back plate connecting the pair of leg plates; a take-up shaft which is rotatably supported between the pair of leg plates, the take-up shaft being provided so as to rotate to take up the webbing belt with a base end portion of the webbing belt being engaged therewith; a motor for rotating the webbing belt; a worm gear that is operatively connected to the motor and that is driven to rotate; a worm wheel that is disposed at the outer side of one of the pair of leg plates and connected to the take-up shaft coaxially therewith, the warm wheel meshing with the worm gear and being rotated due to rotation of the worm gear; a clutch that is interposed between the worm wheel and the take-up shaft, and allows rotation of the worm wheel to be transmitted to the take-up shaft, so as to rotate the take-up shaft in a take-up direction of the webbing; and a case fixed at the outer side of the one leg plate and having the worm wheel, clutch and worm gear accommodated therein, wherein helix angles of teeth of the worm gear and worm wheel are set so that force acting on the worm wheel in an axial direction thereof faces the leg plate, at the time when the take-up shaft rotates in the take-up direction of the webbing due to driving of the motor.

In the aforementioned third aspect, the cover may be provided at the side opposite to that at which the case is fixed at the leg plate, and the worm wheel, worm gear and clutch may also be accommodated between the cover and the leg plate.

Further, in the third aspect, the cover may also be formed integrally with the case.

Furthermore, in the aforementioned third aspect, the case may also be formed so that the side thereof at which the leg plate is fixed is open, and a force generated along the axial direction of the worm wheel directly acts on the leg plate.

Effects of the Invention

As described above, the webbing take-up device according to the present invention has an excellent effect that not only the take-up shaft can be rotated by the motor, but also no improvement in extra strength of components is required, and a light-weight and small-size device and cost reduction of the device can be realized.

BEST MODE FOR CARRYING OUT THE INVENTION

Figure 1:
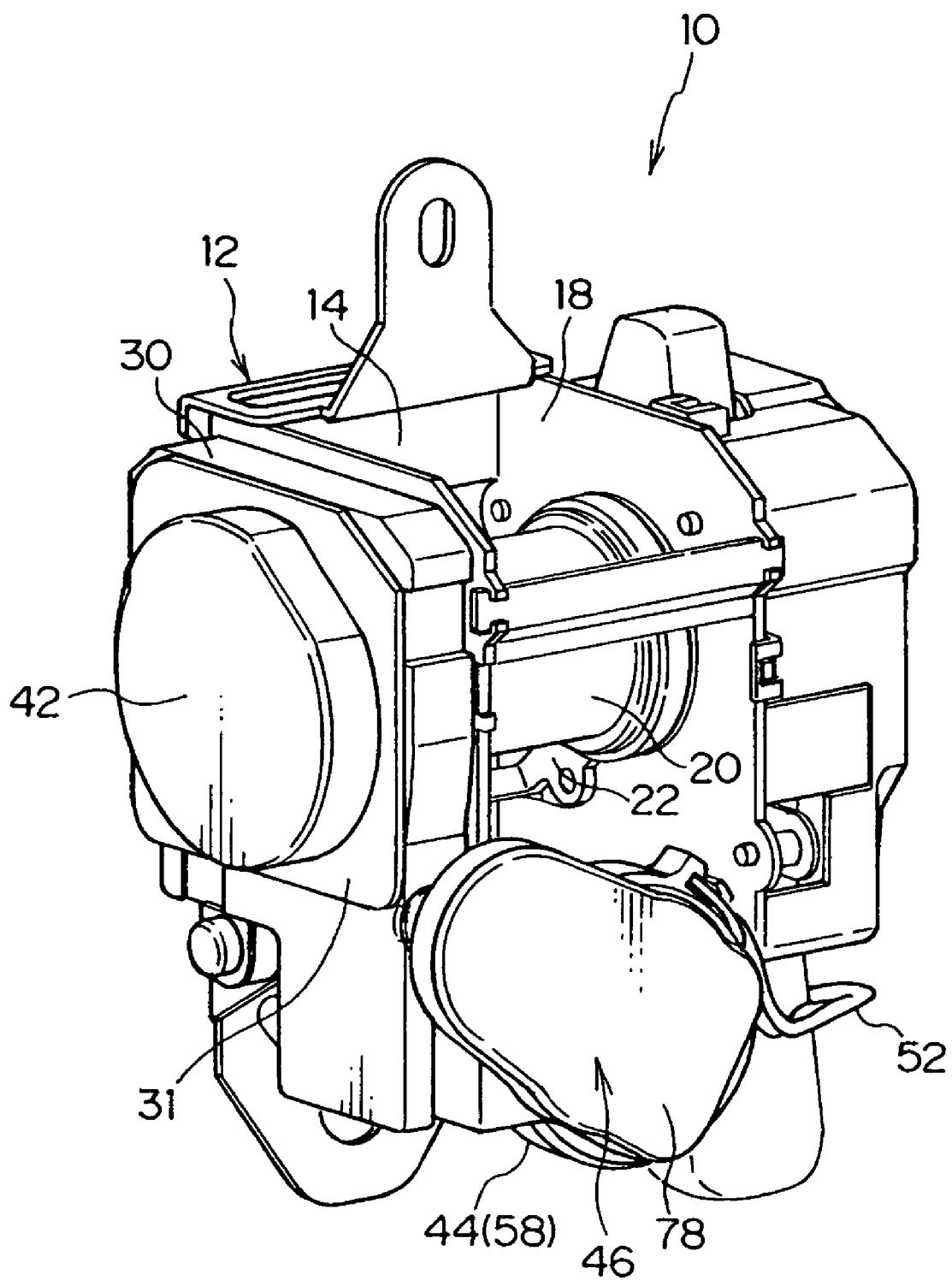
FIG. 1 is a perspective view showing an overall structure of a webbing take-up device according to an embodiment of the present invention.
Figure 2:
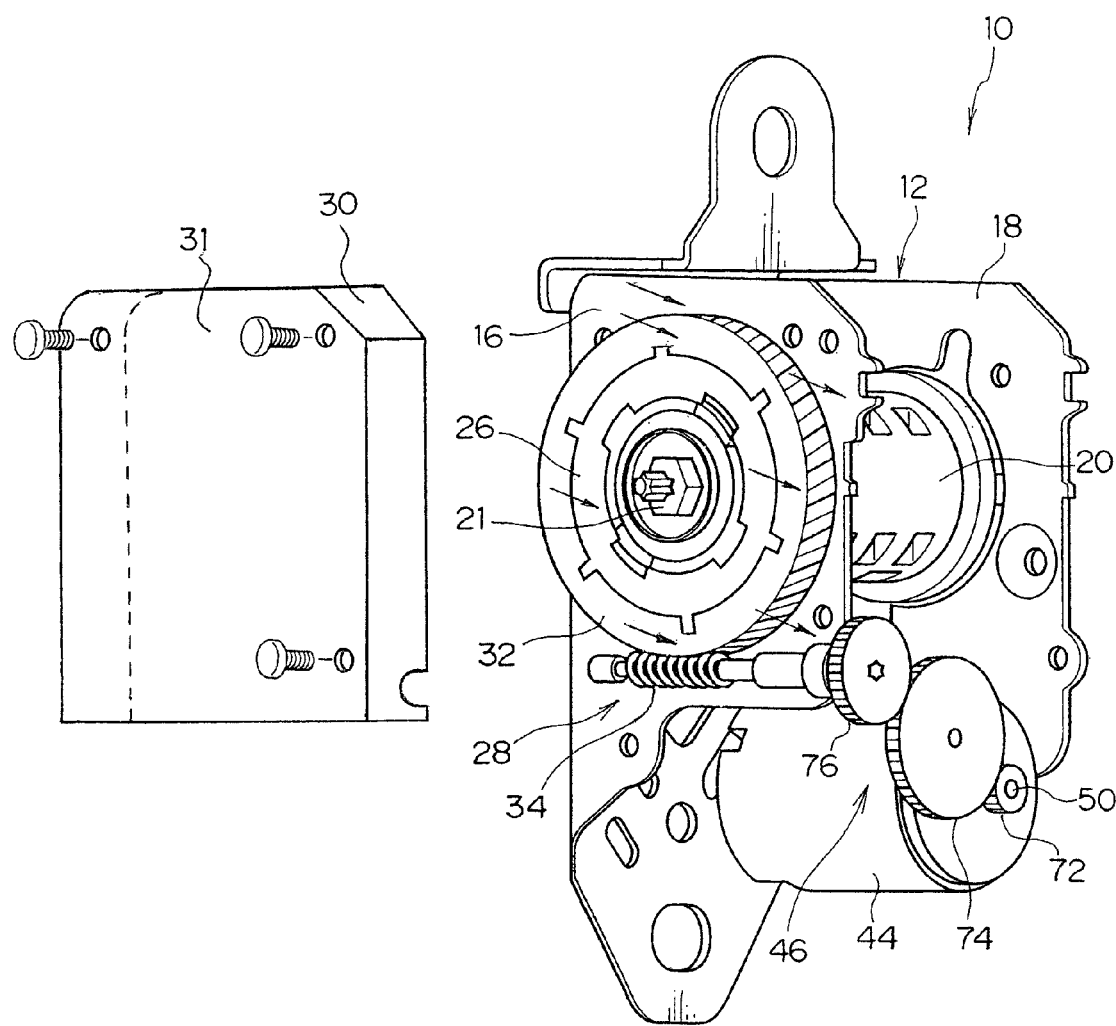
FIG. 2 is a perspective view showing the structure of a principal portion of the webbing take-up device according to another embodiment of the present invention.
Figure 3:
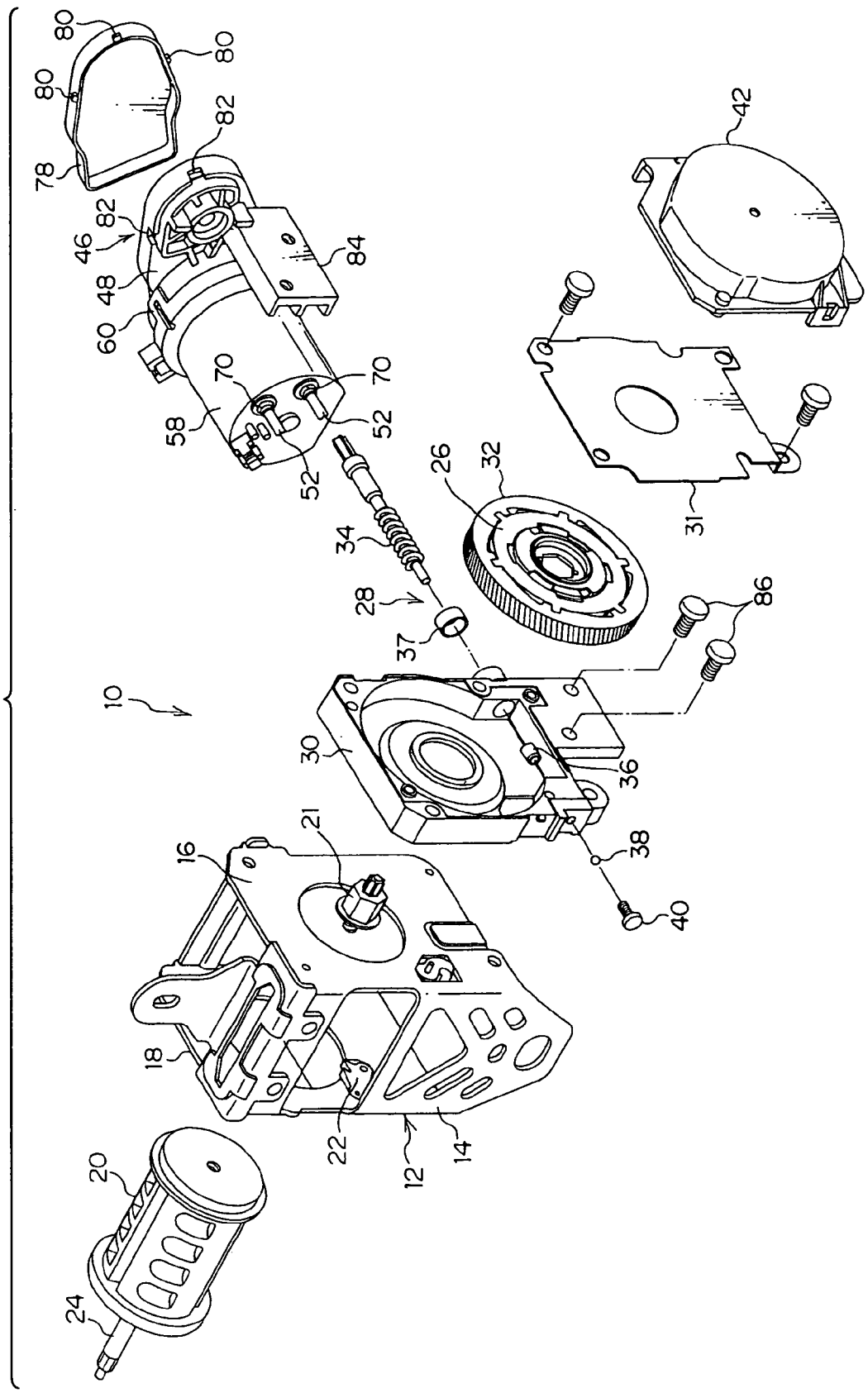
FIG. 3 is an exploded perspective view showing the overall structure of the webbing take-up device according to the embodiment of the present invention illustrated in FIG. 1.

FIG. 1 is a perspective view showing the overall structure of a webbing take-up device 10 according to an embodiment of the present invention, and FIG. 2 is a perspective view showing the structure of the principal portion of the webbing take-up device 10. Further, FIG. 3 is an exploded perspective view showing the overall structure of the webbing take-up device 10.

The webbing take-up device 10 includes a frame 12. The frame 12 is formed by a substantially plate-shaped back plate 14, and a pair of leg plates 16 and 18 integrally extending from both transverse-direction ends of the back plate 14, respectively. The frame 12 is structured to be mounted to a vehicle body in such a manner that the back plate 14 is fixed to the vehicle body by means of unillustrated fastening means such as a bolt.

A take-up shaft 20 produced by die-casting or the like is rotatably disposed between the pair of leg plates 16 and 18 of the frame 12. The take-up shaft 20 is formed in an hourglass shape on the whole, and a base end portion of a webbing belt (not shown) formed into an elongated belt is connected and fixed to the take-up shaft 20. When the take-up shaft 20 is rotated in one direction around its axis (which direction will be hereinafter referred to as a "take-up direction"), the webbing belt is taken up from its base end side onto the outer peripheral portion of the take-up shaft 20 in layers. Meanwhile, if the webbing belt is pulled from its leading end side, it is pulled out while the take-up shaft 20 is rotating (hereinafter, a direction in which the take-up shaft 20 rotates to pull out the webbing belt will be referred to as a "pull-out direction").

One end side of the take-up shaft 20 penetrates the leg plate 18 to protrude outside the frame 12. Disposed at the leg plate 18 side is an unillustrated lock mechanism. The lock mechanism includes an acceleration sensor and is linked to a lock plate 22 bridged between the leg plate 16 and the leg plate 18, and a torsion bar 24 provided at a shaft core portion of the take-up shaft 20. At the time of a rapid deceleration of the vehicle, one end of the torsion bar 24 is restrained via the lock plate 22 due to actuation of the lock mechanism, so as to perform energy absorption. In this state, the rotation of the take-up shaft 20 in the pull-out direction is inhibited.

Incidentally, a connecting screw 21 is mounted at the other end side of the take-up shaft 20. The connecting screw 21 penetrates the leg plate 16 and projects outside the frame 12.

Further, a clutch 26 and a clutch gear portion 28 are disposed at the outer side of the leg plate 16.

The clutch 26 and the clutch gear portion 28 are both accommodated in a case 30, and the clutch 26 is connected to the connecting screw 21. Further, the clutch 26 is linked to a gear wheel 32 that constitutes the clutch gear portion 28. The gear wheel 32 is formed as a so-called worm wheel having worm wheel teeth formed at the outer periphery thereof. The gear wheel 32 is disposed coaxially with the take-up shaft 20, and is mechanically connected to the connecting screw 21 (that is, the take-up shaft 20) via the clutch 26. To this end, if the gear wheel 32 rotates, the driving force of the gear wheel 32 is transmitted to the take-up shaft 20 so that the take-up shaft 20 is rotated in the take-up direction, and at the same time, transmission of rotation generated at the take-up shaft 20 side is interrupted to prevent the rotation from being transmitted to the gear wheel 32. Further, the leading end of the connecting screw 21 connected to the clutch 26 penetrates the clutch 26 and extends sidewise from the clutch 26.

Provided within the case 30 is the worm gear 34 that constitutes the clutch gear portion 28. The worm gear 34 is provided so that the axis thereof is disposed orthogonal to the take-up shaft 20, and the end portion of the worm gear is supported by the case 30 via bushes 36 and 37, and the worm gear 34 engages with the gear wheel 32. Further, one end side of the worm gear 34 is provided so as to protrude outside the case 30. A steel ball 38 is accommodated in a bearing portion of the case 30, which supports the leading end portion of the worm gear 34, so as to come into contact with the leading end portion of the worm gear 34. Further, an adjustment screw 40 is screwed into the bearing portion. The adjustment screw 40 causes the steel ball 38 to come into contact with the leading end of the worm gear 34 by pressing against the steel ball 38 at the leading end thereof. As a result, displacement of the worm gear 34 in the axial direction is regulated (thrust adjustment is made). Due to the worm gear 34 rotating, the gear wheel 32 is structured to rotate.

Helix angles of teeth of the worm gear 34 and the gear wheel 32 are set so that thrust force generated along the axial direction of the gear wheel 32 when the gear wheel 32 is rotated due to the rotation of the worm gear 34 (at the time when the take-up shaft 20 rotates in the webbing take-up direction) faces the leg plate 16 fixed side of the case 30.

The case 30 in which the clutch 26 and the clutch gear portion 28 are accommodated as described above is covered by a plate-shaped cover at the side thereof opposite to the leg plate 16, that is to say, by a cover clutch 31.

In this way, the clutch 26 and the clutch gear portion 28 are assembled integrally with a single case 30, and these components are formed into a unit-type structure on the whole.

A spring complete 42 is disposed at the side of the clutch 26 and the clutch gear portion 28 (the case 30). The spring complete 42 accommodates therein a spiral spring (not shown). The spiral spring is engaged with a case main body at its end portion outward in a spiral direction, and the end portion of the spiral spring inward in the spiral direction is engaged with the leading end of the connecting screw 21 penetrating the clutch 26, thereby causing the take-up shaft 20 to be urged in the take-up direction.

Incidentally, a motor 44 and a portion of a motor gear portion 46 are disposed below the take-up shaft 20 between the leg plate 16 and the leg plate 18.

Figure 4:
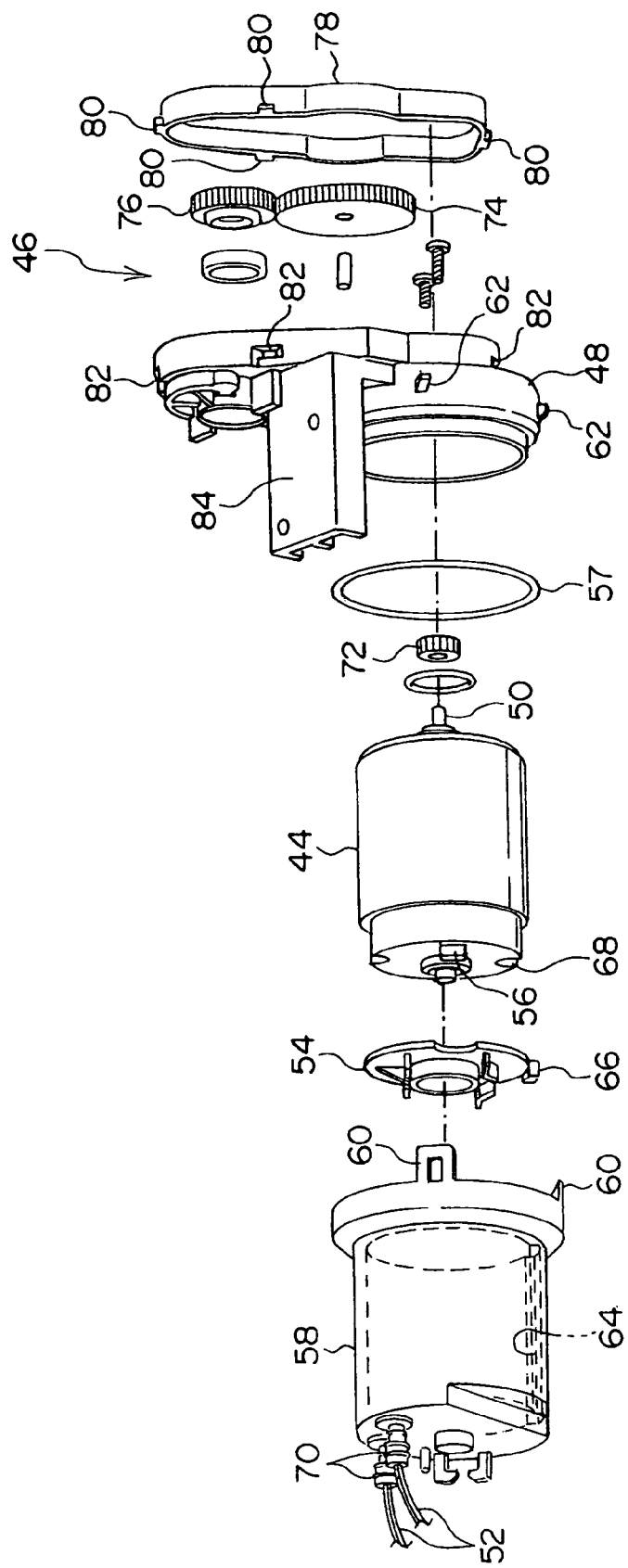
FIG. 4 is an exploded perspective view showing the structures of a motor and a motor gear portion of the webbing take-up device according to the embodiment of the present invention illustrated in FIG. 1.

FIG. 4 is an exploded perspective view showing the structures of the motor 44 and the motor gear portion 46.

The motor 44 and the motor gear portion 46 are provided with a housing 48. The motor 44 is mounted at one side of the housing 48, and the motor gear portion 46 is provided at the other side of the housing 48. The motor 44 is fixed at one side of the housing 48 so that the leading end side (output side) of the rotating shaft 50 faces the housing 48. The leading end (output side) of the rotating shaft 50 protrudes toward the other side of the housing 48 (the motor gear portion 46 side).

Further, a base plate 54 is mounted at a rear end side of the motor 44. Electric harnesses 52 for driving a motor are mounted and trailed to the base plate 54. The electric harnesses 52 are connected by a pressure terminal structure to a power feeding terminal 56 provided in the main body portion of the motor 44.

Moreover, the motor 44 is covered by a motor cover 58 via an O ring 57. Pawl portions 60 are provided in the motor cover 58, and due to the pawl portions 60 being respectively fitted in and engaged with pawl-supporting projections 62 provided in the housing 48, the motor cover 58 is fixed to the housing 48.

Furthermore, a first concave portion 64 is provided in the motor cover 58, and a convex portion 66, which is fittable into the first concave portion 64, is provided in the base plate 54 in correspondence with the first concave portion 64. In addition, the aforementioned motor 44 includes a second concave portion 68, into which the convex portion 66 can be fitted, in correspondence with the convex portion 66 of the base plate 54.

In other words, the motor 44 is positioned with respect to the base plate 54 with the convex portion 66 being fitted into the second concave portion 68, and the base plate 54 is positioned with respect to the motor cover 58 with the convex portion 66 being fitted into the first concave portion 64, and further the claw portions 60 are fitted and engaged with the claw-supporting protrusions 62, so as to allow the motor cover 58 to be mounted and fixed to the housing 48. Thus, the mounting position of the motor 44 around its axis with respect to the housing 48 is determined in a univocal manner.

Further, the electric harnesses 52 for driving a motor are taken out from the rear end portion of the motor cover 58 so as to face the back plate 14 of the frame 12 at the side opposite to the output side of the motor 44. Portions of the motor cover 58 from which the electric harnesses 52 are taken out are brought into a waterproof state with rubber caps 70.

A pinion 72 that constitutes a plurality of spur teeth of the motor gear portion 46 is mounted at the leading end of the rotating shaft 50 of the motor 44, which protrudes toward the other side of the housing 48 (toward the motor gear portion 46 side). Further, in the motor gear portion 46, a gear 74 and a gear 76 which are respectively formed as external spur gear wheels to form driving force transmission means are accommodated in such a state as to mesh with each other. These gears 74 and 76 are disposed so that the respective axes are parallel to the rotating shaft 50 of the motor 44, and the gear 74 meshes with the pinion 72. The gear 76 serving as a final spur gear wheel is removably connected at one end portion of the worm gear 34 protruding from the case 30 of the clutch gear portion 28 to the outer side. Accordingly, the output shaft of the motor becomes parallel to the shaft of the worm gear. To this end, when the motor 44 is driven, the driving force of the motor 44 is transmitted to the worm gear 34 via the pinion 72, the gear 74 and the gear 76, so as to rotate the worm gear 34.

Further, the pinion 72, the gear 74 and the gear 76 are covered by a gear cover 78 mounted at the housing 48. Pawl portions 80 are provided at the gear cover 78 and are fitted and engaged with claw-supporting portions 82 provided in the housing 48, thereby allowing the gear cover 78 to be fixed to the housing 48.

In this way, the motor 44 and the motor gear portion 46 are each integrally mounted at a single housing 48, and a unit-type structure is thereby formed on the whole.

In the motor 44 and the motor gear portion 46 as structured above, a mounting stay 84 provided integrally with the housing 48 is removably mounted by screws 86 to the case 30 (that is, the frame 12) having the clutch 26 and the clutch gear portion 28 accommodated therein. In the state in which the housing 48 is mounted and fixed to the case 30 (frame 12), the motor 44 is brought into a state in which the rotating shaft 50 is orthogonal to the take-up shaft 20 and the output side thereof faces the side opposite to the side at which the back plate 14 of the frame 12 is disposed. Furthermore, the motor 44 is positioned directly below the take-up shaft 20 between the pair of leg plates 16 and 18.

Further, in the motor 44 and the motor gear portion 46 having the aforementioned structures, the gear 76 of the motor gear portion 46, serving as the final spur gear wheel, is connected to the clutch 26 and also to the worm gear 34 of the clutch gear portion 28 in a detachable manner, and additionally, the mounting stay 84 is removably mounted to the case 30 by the screws 86. For this reason, by removing the screw 86 to detach the mounting stay 84 from the case 30, the motor 44 and the motor gear portion 46 can be separated from the case 30 (frame 12) in the state of being assembled.

In addition, the aforementioned motor 44 is constructed so as to be activated based on, for example, a detection signal from a forward looking monitoring device or the like.

Next, operation of the present embodiment will be described.

In the webbing take-up device 10 having the aforementioned structure, a vehicle occupant sits at a seat of a vehicle, and a webbing belt is applied around the body of the occupant, and for example, a tongue plate provided in the webbing belt is engaged with a buckle device, thereby allowing the webbing belt to be secured over the body of the occupant.

In the state in which the webbing belt is applied, even if the webbing belt is taken up or pulled out due to the body of the vehicle occupant moving, that is to say, even if the take-up shaft 20 rotates in the take-up direction or in the pull-out direction, there is no possibility that the rotating force of the take-up shaft 20 is transmitted by the clutch 26 to the rotating shaft 50 of the motor 44.

Incidentally, for example, if an obstacle exists ahead of a vehicle during a running operation of the vehicle and a space between the vehicle and the obstacle (a distance from the vehicle to the obstacle) falls within a predetermined range, driving of the motor 44 is started and the rotating shaft 50 is rapidly rotated.

When the rotating shaft 50 of the motor 44 is rotated, the rotating force of the motor is transmitted to the clutch 26 by the pinion 72, gear 74 and gear 76 of the motor gear portion 46, and the worm gear 34 and gear wheel 32 of the clutch gear portion 28. The rotating force is also transmitted via the clutch 26 to the take-up shaft 20, and the take-up shaft 20 is thereby rotated in the webbing take-up direction. As a result, a looseness generated in the webbing belt, that is, "slack" is eliminated, and a restraining force by which the webbing belt restrains the body of the vehicle occupant increases. If, subsequently, an operation of suddenly applying the brake to a vehicle is performed by the vehicle occupant and the vehicle is brought into a sudden deceleration state, the webbing belt is reliably secured over the body of the occupant.

Further, if the motor 44 is stopped in the state in which the slack is eliminated, mechanical connection of the rotating shaft 50 of the motor 44 and the take-up shaft 20 is released.

In the webbing take-up device 10 according to the present embodiment, the clutch 26 is disposed at the outer side (sideward) of the leg plate 16 among the pair of leg plates 16 and 18 constituting the frame 12 for supporting the take-up shaft 20. In addition, the motor 44 is disposed directly below the take-up shaft 20 between the leg plate 16 and the leg plate 18 with the rotating shaft 50 being orthogonal to the take-up shaft 20. Therefore, as compared to the structure in which the motor 44 is disposed outside the frame 12, the webbing take-up device 10 of the present invention can be drastically made smaller on the whole. That is to say, the present device has the structure in which a relatively massive component such as the motor 44 is disposed directly below the take-up shaft 20 between the pair of leg plates 16 and 18, and therefore, the motor 44 which is the massive component never protrudes outside the frame 12 (the leg plates 16 and 18). This makes it possible to effectively utilize a space between the pair of leg plates 16 and 18, and also make the device smaller on the whole. In addition, as compared to the structure in which the motor 44 is disposed outside the frame 12, the aforementioned structure in which the motor 44 is disposed directly below the take-up shaft 20 between the pair of leg plates 16 and 18 allows the overall weight balance of the webbing take-up device 10 to be achieved at the central side in the direction to which the leg plate 16 and the leg plate 18 face each other, and also allows the webbing take-up device 10 to be made stable in terms of weight.

Further, the webbing take-up device 10 according to the present embodiment has the structure in which the clutch 26 is disposed sideward of the one leg plate 16 and the motor 44 is disposed directly below the take-up shaft 20 between the pair of leg plates 16 and 18, and therefore, the motor 44 and the clutch 26 can be disposed close to each other. In addition, the output side of the rotating shaft 50 of the motor 44 is disposed so as to face the side opposite to a side at which the back plate 14 of the frame is disposed, and therefore, the motor gear portion 46 and the clutch gear portion 28 (driving force transmission means), by which the rotating shaft 50 of the motor 44 and the clutch 26 are connected with each other, can be disposed readily. Accordingly, the motor gear portion 46 and the clutch gear portion 28 can be simply structured. In this connection as well, the device can be made smaller, and further, the cost thereof can be reduced.

Moreover, in the aforementioned structure, a relatively heavy-weight component such as the motor 44 is disposed directly below the take-up shaft 20 between the pair of leg plates 16 and 18. Therefore, the motor 44 can be supported by means of not only any one of the leg plates 16, 18 and the back plate 14 connecting these leg plates 16 and 18, but if necessary, by means of any two or all of the pair of leg plates 16, 18 and the back plate 14. This eliminates improvement of extra strength for supporting the motor 44. As a result, the light-weight device and cost reduction thereof can be realized.

Furthermore, in the webbing take-up device 10 according to the present embodiment, helix angles of teeth of the worm gear 34 and the gear wheel 32 are set so that thrust force generated along the axial direction of the gear wheel 32 at the time when the take-up shaft 20 is rotated by driving of the motor 44 in the webbing take-up direction faces the leg plate 16 fixed side of the case 30 (that is, the side opposite to that at which the cover clutch 31 is disposed). Accordingly, the thrust force generated along the axial direction of the gear wheel 32, which is caused by engagement between the worm gear 34 and the gear wheel 32 when the motor 44 is rapidly rotated so as to rotate the take-up shaft 20 in the take-up direction, acts on the leg plate 16 fixed side of the case 30, that is to say, the frame 12.

As a result, it becomes unnecessary for extra strength and rigidity of each of the case 30 and the cover clutch 31 to be improved so that they can resist a large thrust force or reaction force, and the constitutional size (material thickness dimensions or the like) of the case 30 or the cover clutch 31 can be made smaller. Further, a fixing method thereof, and so on can be simplified. Accordingly, a light-weight or a small-size device or cost reduction thereof can be realized.

Furthermore, the thrust force generated in the gear wheel 32 is reliably received by the frame 12, and therefore, the rotating force can be stably and reliably transmitted to the take-up shaft 20 via the worm gear 34 and the gear wheel 32, and further via the clutch 26, thereby resulting in that the performance of taking up a webbing belt becomes stable.

In the aforementioned embodiment, the structure in which the case 30 and the cover clutch 31 are formed as separate members was illustrated, but the present invention is not limited to the same. The case 30 and the cover clutch 31 may also be formed integrally with each other with the case 30 having a side that is open toward the leg plate 16, as indicated in FIG. 2.

In this case as well, the thrust force generated along the axial direction of the gear wheel 32, which force is caused by engagement between the worm gear 34 and the gear wheel 32 when the motor 44 is rapidly rotated so as to rotate the take-up shaft 20 in the take-up direction as described above, directly acts on the leg plate 16 at which the case 30 is fixed, that is, the frame 12. Accordingly, it becomes unnecessary that extra strength and rigidity of the case 30 should be improved so that it can resist a large thrust force or reaction force, and the constitutional size (material thickness dimensions or the like) of the case 30 can be made smaller. Further, a fixing method thereof, and so on can be simplified. Accordingly, a light-weight or small-size structure of the device, or cost reduction thereof can be realized. Further, the thrust force generated in the gear wheel 32 is reliably received by the frame 12, and therefore, the rotating force can be stably and reliably transmitted to the take-up shaft 20 via the worm gear 34 and the gear wheel 32, and further via the clutch 26, thereby resulting in that the performance of taking up a webbing belt becomes stable.

INDUSTRIAL APPLICABILITY

The present invention can be applied to a webbing take-up device of a seat belt apparatus for restraining a vehicle occupant. When a take-up shaft of a webbing is rotated by a motor, an axial-direction force acting on a rotating force transmission mechanism is regulated so as to be directed toward a frame. Therefore, it is possible to realize a light-weight and small-size structure of the device, and cost reduction thereof without requiring extra strength for a structure having the rotating force transmission mechanism accommodated therein.

Explanation of Reference Numerals 10 webbing take-up device
12 frame
14 back plate
16 leg plate
18 leg plate
20 take-up shaft
26 clutch
28 clutch gear portion
30 case
31 clutch cover (cover)
32 gear wheel (worm wheel)
34 worm gear motor
44 motor
46 motor gear portion

What is claimed is:

1. A webbing take-up device, comprising:
a frame having a pair of leg plates that face each other, and a back plate, the pair of leg plates being connected integrally by the back plate;
a take-up shaft that is rotatably supported between the pair of leg plates and that takes up a webbing belt for restraining a vehicle occupant by rotating in one direction around its axis with a base end portion of the webbing belt being engaged with the take-up shaft;
a motor;
a case fixed on a side of either one of the pair of leg plates;
a cover that covers a side of the case opposite to a side at which one leg plate is fixed;
a worm gear accommodated in the case and connected to the motor;
a worm wheel accommodated in the case coaxially with the take-up shaft and meshing with the worm gear, the worm wheel being rotated by rotation of the worm gear, said worm wheel being coaxially connected to and axially movable with respect to the take-up shaft and in load bearing engagement with one of said side of said one leg plate and said case mounted on said side of one leg plate and having teeth disposed at an angle relative to an axial direction of the worm wheel; and
a clutch accommodated in the case and mechanically interposed between the worm wheel and the take-up shaft, the clutch being provided so as to rotate the take-up shaft in a webbing take-up direction by directly transmitting rotating force of the worm wheel to the take-up shaft, and interrupting transmission of rotating force generated at the side of the take-up shaft, thereby preventing transmission of the rotation to the worm wheel, all of said clutch being on the same side of said one leg plate as said worm wheel,
wherein helix angles of teeth of the worm gear and worm wheel are set so that a thrust force acting upon the worm wheel in the axial direction of the worm wheel acts against said one leg plate at a time when the take-up shaft is directly driven by said motor through said clutch in the webbing take-up direction to remove slack in said webbing due to an emergency condition.

2. A webbing take-up device, comprising:
a frame having a pair of leg plates that face each other, and a back plate, the pair of leg plates being connected integrally by the back plate;
a take-up shaft that is rotatably supported between the pair of leg plates and that takes up a webbing belt for restraining a vehicle occupant by rotating in one direction around its axis with a base end portion of the webbing belt being engaged with the take-up shaft;
a motor;
a case fixed on a side of either one of the pair of leg plates;
a worm gear accommodated in the case and connected to the motor;
a worm wheel accommodated in the case coaxially with the take-up shaft and meshing with the worm gear, the worm wheel being rotated by rotation of the worm gear, said worm wheel being coaxially connected to and axially movable with respect to the take-up shaft and in load bearing engagement with one of said side of said one leg plate and said case mounted on said side of one leg plate and having teeth disposed at an angle relative to an axial direction of the worm wheel; and
a clutch accommodated in the case and mechanically interposed between the worm wheel and the take-up shaft, the clutch being provided so as to rotate the take-up shaft in a webbing take-up direction by transmitting rotating force of the worm wheel to the take-up shaft, and interrupting transmission of rotating force generated at the side of the take-up shaft, thereby preventing transmission of the rotation to the worm wheel, all of said clutch being on a same side of said one leg plate as said worm wheel,
wherein helix angles of teeth of the worm gear and worm wheel are set so that a thrust force acting upon the worm wheel in the axial direction of the worm wheel acts against said one leg plate at a time when the take-up shaft is directly driven by said motor through said clutch in the webbing take-up direction to remove slack in said webbing due to an emergency condition.

3. A webbing take-up device for taking up a webbing belt for restraining a vehicle occupant, comprising:
a frame having a pair of leg plates facing each other, and a back plate connecting the pair of leg plates;
a take-up shaft which is rotatably supported between the pair of leg plates, the take-up shaft being provided so as to rotate to take up the webbing belt with a base end portion of the webbing belt being engaged therewith;
a case fixed at an outer side of one of said leg plates;
a motor for rotating the webbing belt;
a worm gear that is operatively connected to the motor and that is driven to rotate;
a worm wheel that is disposed at the outer side of one of the pair of leg plates and connected to the take-up shaft coaxially therewith, the worm wheel meshing with the worm gear and being rotated due to rotation of the worm gear, said worm wheel being coaxially connected to and axially movable with respect to the take-up shaft and in load bearing engagement with one of said outer side of said one leg plate and said case mounted on said outer side of one leg plate and having teeth disposed at an angle relative to an axial direction of the worm wheel;
a clutch that is interposed between the worm wheel and the take-up shaft, and allows rotation of the worm wheel to be transmitted to the take-up shaft, so as to rotate the take-up shaft in a take-up direction of the webbing, all of said clutch being on the same outer side of said one leg plate as said worm wheel;
wherein said case fixed at the outer side of the one leg plate accommodates the worm wheel, clutch and worm gear therein, and
wherein helix angles of teeth of the worm gear and worm wheel are set so that a thrust force acting on the worm wheel in an axial direction thereof acts against the outer side of the one leg plate, at a time when the take-up shaft is directly driven by said motor through said clutch in the take-up direction of the webbing to remove slack in said webbing due to an emergency condition.

4. The webbing take-up device according to claim 3, further comprising a cover disposed at a side of the case opposite to the outer side of the leg plate at which the case is fixed, wherein the worm wheel, worm gear and clutch are accommodated between the cover and the leg plate.

5. The webbing take-up device according to claim 4, wherein the cover is formed integrally with the case.

6. The webbing take-up device according to claim 3, wherein the case is formed so that the side thereof at which the leg plate is fixed is open, and the force acting on the worm wheel in the axial direction thereof is directly exerted against the outer side of the one leg plate.

7. The webbing take-up device according to claim 3, wherein when rotation of the take-up shaft occurs as a result of an unwinding force applied to the webbing belt, the clutch operates so as to prevent transmission of rotation from the take-up shaft, to the worm wheel.

8. The webbing take-up device according to claim 3, wherein the motor is disposed between the pair of leg plates.

9. The webbing take-up device according to claim 3, wherein the motor is disposed so that an output shaft thereof is substantially parallel to a shaft of the worm gear.

10. The webbing take-up device according to claim 3, wherein the motor is disposed between the pair of leg plates so that an output shaft thereof is positioned at a side opposite to that at which the back plate is disposed.

11. The webbing take-up device according to claim 3, wherein the clutch is concentrically disposed within said worm wheel and wherein an axial thickness of said clutch is substantially the same as an axial thickness of said worm wheel.

* * * * *